May 27, 1924.
O. J. MARSHICK
1,495,421
AUTOMATIC POWER REGULATOR FOR ELECTRICALLY HEATED APPARATUS
Filed Nov. 1, 1920  3 Sheets-Sheet 1
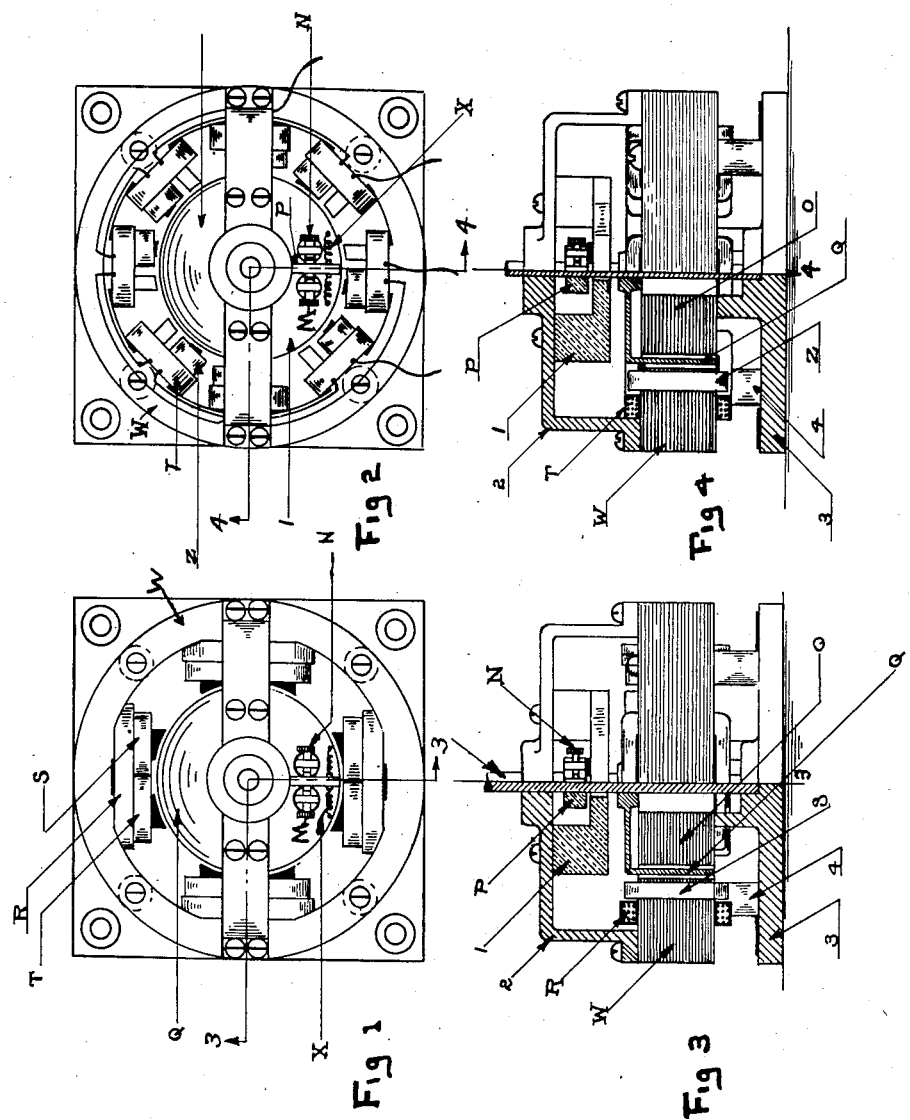
Oliver J. Marshick
INVENTOR.
BY
William M. Swan
ATTORNEY.

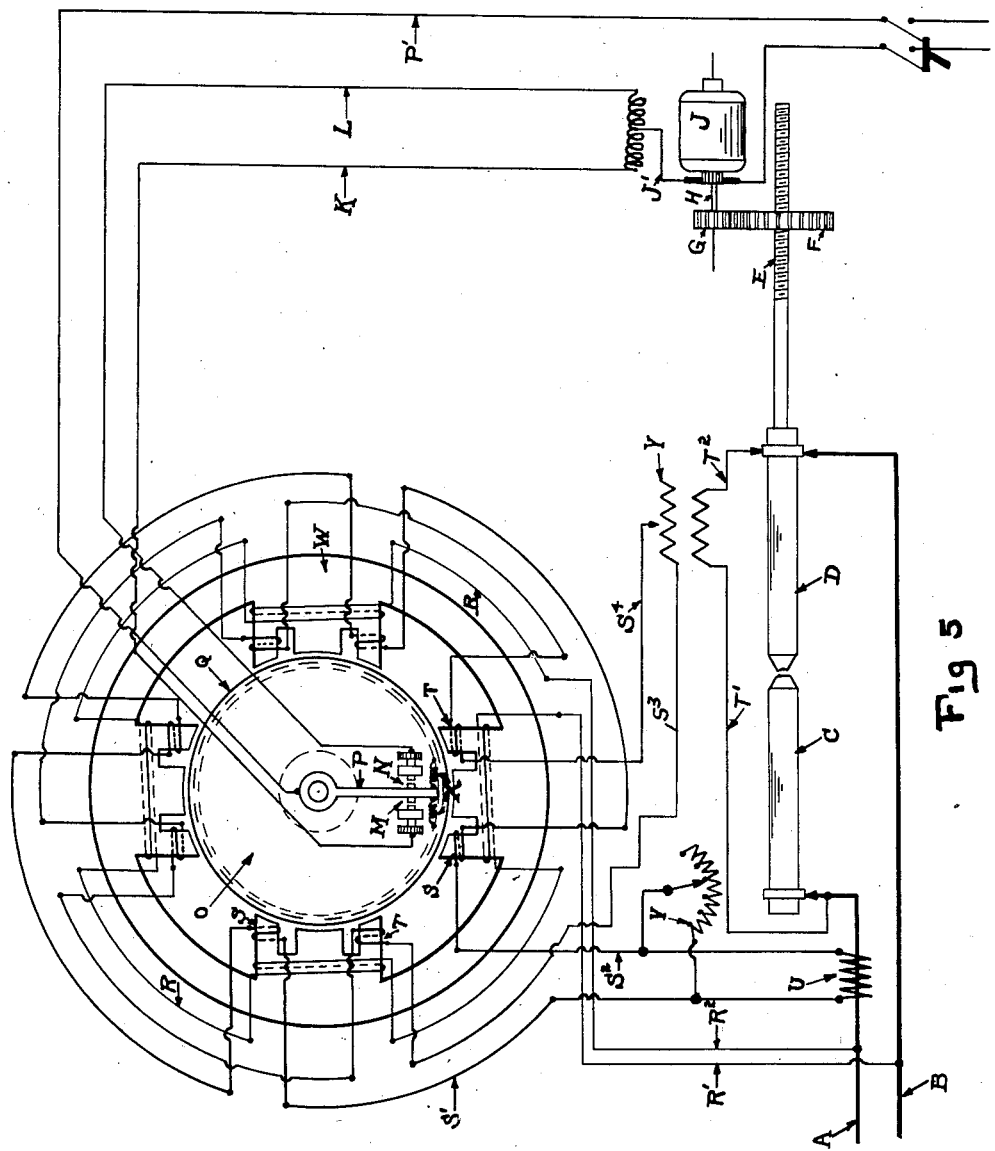

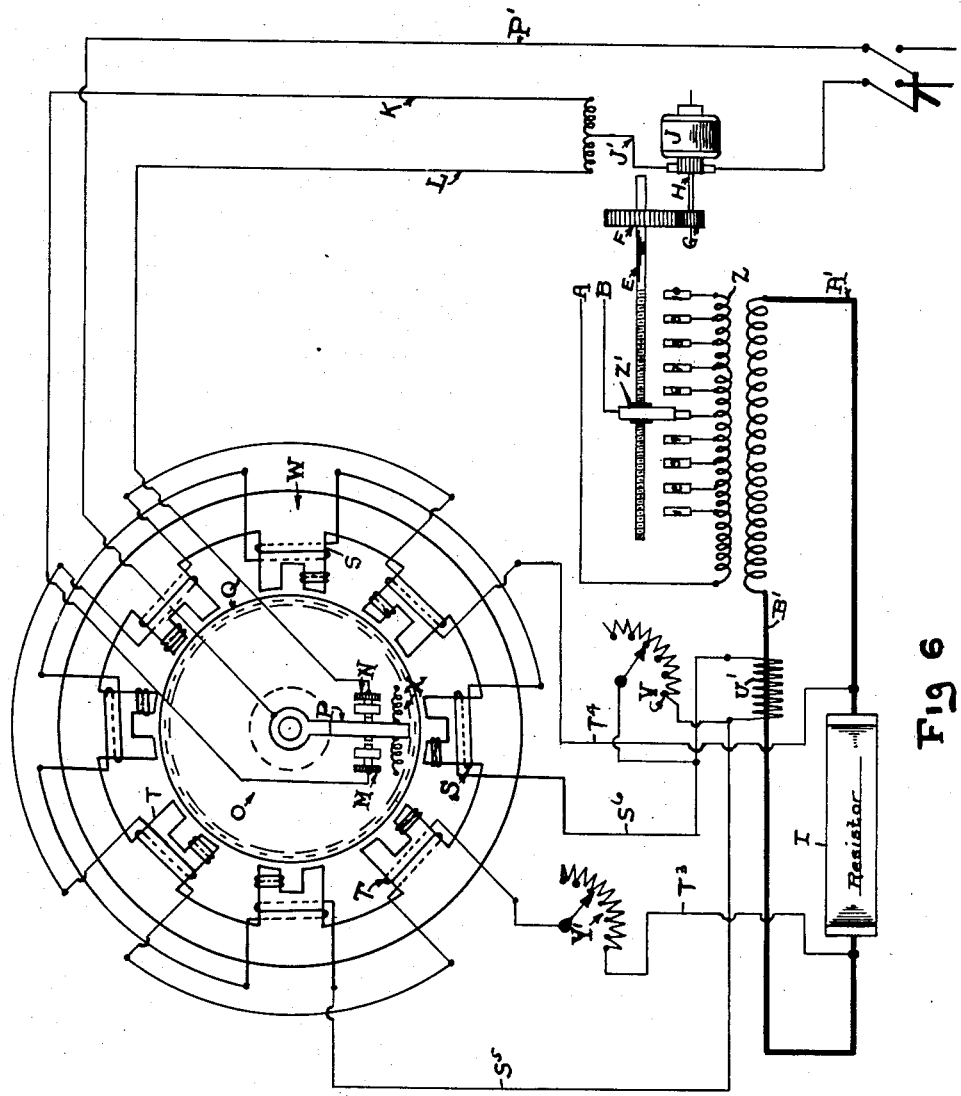

Patented May 27, 1924.

1,495,421

UNITED STATES PATENT OFFICE.

OLIVER J. MARSHICK, OF DETROIT, MICHIGAN.

AUTOMATIC POWER REGULATOR FOR ELECTRICALLY-HEATED APPARATUS.

Application filed November 1, 1920. Serial No. 420,995.

*To all whom it may concern:*

Be it known that I, OLIVER J. MARSHICK, a citizen of the United States, residing at Detroit, in the county of Wayne, State of Michigan, have invented a certain new and useful Improvement in Automatic Power Regulators for Electrically-Heated Apparatus, and declare the following to be a full, clear, and exact description of the same, such as will enable others skilled in the art to which it pertains to make and use the same, reference being had to the accompanying drawings, which form a part of this specification.

This invention relates to the automatic regulation of power input into electrically heated apparatus, such as electrically heated ovens, resistance furnaces, arc furnaces, and the like, where it is advantageous to control either the current or the potential or both. It has for its object the attainment of closer regulation, relatively free from the variations to which the art has applied the term "hunting." By the employment of my device, the necessity of using a low voltage relay is obviated, this being something that has heretofore been necessary to prevent the jamming together of the electrodes when the power supply for the furnace fails.

The theory of my improved device centers about the organization, relatively to an oscillable contact member, of a plurality of actuating windings, two or more of which are so arranged as to act in opposition to one another, and, as first one and then the other becomes dominant, to act upon the oscillable contact member accordingly, and consequently hold within the desired limits the variations in distance separating the tips of a pair of coaxially disposed electrode members. The function performed by my regulator is the balancing of the current flowing through and the potential across the current consuming device, which, as I have here chosen for illustration, is the pair of electrodes, although as already brought out, and as will be hereinafter explained further, is adaptable, well within the scope of my idea, to other similar and analogous uses.

In the drawings:

Figure 1 is a plan view of one form of regulator, wherein a field winding is used, Figure 2 is a similar plan view of a modified form of regulator wherein shading coils are used over the pole pieces, Figure 3 is a half sectional and half elevational view of the device of Figure 1, with that portion bordered by the line 3—3 thereof cut away, Figure 4 is a similar half sectional and half elevational view of the device of Figure 3, cut away along the line 4—4 thereof, Figure 5 is a diagrammatic showing of the regulator and its connections applied to the electrodes of an electric arc furnace, Figure 6 is a diagrammatic showing of a slightly modified construction of the regulator and its connections applied to a resistor.

A and B (see Figure 5) represent conductor wires leading from a source of electrical energy, with their ends connected to a pair of electrodes C and D, which may be understood as projecting within the chamber of an electric furnace. One only of these members, as, for example, D, need be movable, and its projection and retraction lengthwise of its axis is cared for by means of a screw-shaft, E, to which is keyed a gear-wheel, F, whose teeth mesh with the teeth of a similar gear-wheel, G, on the shaft H of an electric motor, J. The direction of rotative movement of this motor of course determines the direction and degree of movement of the electrode D toward or away from the other electrode C. From the motor J and its nearby wire, J', branch a pair of wires K and L, which lead to their relative contact terminals M and N, which are fixed to the stator element, W, centrally within which is pivoted a rotor member which includes a contact arm P from which leads the return wire P'. Immediately outside of the stator core O is located the rotor cup, Q, which in turn is surrounded by the stator W within which project the poles which support the exciting or field coils R and the current coils S; and also arranged thereabout are the potential coils, T. Of these several coils, the field coils R are connected with the energizing wires A and B by means of lead wires R' and R²; and the current coils are similarly energized from the main circuit wires A and B through the medium of the current transformer U. The energization of the potential coils T is effected through the wires T' and T² and the potential transformer Y; this latter, if desired, may be omitted, and suitable windings for the higher potential substituted; my experience has shown, however, that a construction employing a potential transformer at this point is preferable.

A polarized relay being extremely sensitive to small variations in current because of the great proportional change in flux density, the supplying of an additional flux derived from a field winding has been found very desirable; and it has been my experience that the placing of the field or exciting coils around the poles of the relay in a generally similar way to the present practice as to electric motors is very satisfactory in its results, though I do not desire my disclosure to be restricted thereto. This idea is equally applicable to the current winding and the potential winding, subject to the restriction that these are displaced with reference to the field, producing a rotating field which induces currents in the rotor and effects its turning. This rotating field is augmented by making the exciting circuit highly inductive, while keeping the inductance of the potential and current circuits as low as possible.

The current winding S and the potential winding T are arranged to so act in opposition to one another that, when, for example, the current winding S predominates, the rotor Q turns so as to swing the contact arm P against the terminal M; and conversely, when the potential winding T predominates the turn of the rotor Q swings the contact arm against the terminal N. The closing of either circuit energizes an electromagnetic responsive device to effect the restoration to normal of the power input.

The initial energization of the circuit and its consequent influence upon the potential circuit causes the rotor cup Q to move about its axis and then swing the arm P into contact with the terminal N, thereby so actuating the motor J as to move the electrode D toward the electrode C. The electrodes becoming short-circuited, a flow of current through the electrodes is set up, a proportional part of it being accordingly diverted through the transformer U, thereby swinging the contact member P so as to engage the opposite terminal M, thereby actuating the motor in the opposite direction and consequently drawing the electrode D away from the electrode C. As soon as the separation of the electrodes is effected, the building up of voltage begins once more, and the current decreases until a condition of equilibrium is reached, when the motor circuit is opened. A new unbalancing of the current and voltage circuits will result as the burning of the electrodes progresses or as a change in atmospheric conditions within the furnace chamber takes place, and the oscillable regulator or contact piece again swings into contact with the terminal N (or M, depending on what conditions are then prevailing within the furnace), and this process keeps up as long as the energization of the electrodes is in progress. When no potential is impressed across the electrodes, their joining together is prevented, since the regulator returns to neutral or "off" position immediately upon the failure of the power supply; reliance upon a low voltage release relay, at best uncertain in its action, is thus avoided.

I may also employ a shunt rheostat, V, connecting across the lead wires $S'$ and $S^2$, for adjusting the regulator according to the input desired to be supplied to the furnace. This latter is only one of several equivalent and well-known electrical media for effecting this predetermined regulation, and I desire the scope of this disclosure to be understood accordingly, the basic principle of the entire construction being the balancing against, or in opposition to, one another, of the influences upon the rotor cup Q of the current winding and the potential windings, so that when, and in case, the forces thereof are balanced, the oscillable regulator will remain in neutral position, which position it moves away from and into contact with one or the other of the terminals M or N, according to the predominance of the potential or current supplied to the windings. The mechanism is thus rendered responsive to such variances in operative conditions as changes of the atmosphere within the furnace chamber, the consumption of the electrodes, changes in voltage, or changes in resistance. For example, if a regulator is being used which maintains a constant current or a constant voltage on a two-electrode furnace arcing over a bath, it has heretofore been practically impossible to so control the electrodes that both shall have arcs above the bath; whereas in my device the current passing through the electrodes may be balanced against the potential across the arc from the bath to the electrodes, thereby insuring a predetermined potential across each arc. And since this disclosure concerns itself with the lengthwise movement of only one electrode, when two or more are mentioned, it is obviously applicable to a use wherein the molten bath is made to serve as one of the electrodes, the distance of the movable electrode above the bath being regulated, just as herein described, with reference to the arc desired.

As hereinbefore briefly stated, the modified construction shown in Figure 6 is designed especially for use with a resistor instead of electrodes, current coil and potential coil only being arranged about the rotor. One of the main circuit wires, as B, is connected with the movable contact piece $Z'$ which is mounted on the shaft E so that it may engage one or another of the contacts of the transformer Z, according to the strength of current prevailing, number 10 at the right-hand end of the row representing the minimum and number 1 at the left-hand end of the row representing the maximum. The other main current wire, as A, leads to permanent connection with the end of the undivided portion of transformer Z. From the opposite side of the transformer Z lead the wires A' and B', in which the resistor I is placed; and across this resistor are connected the potential connections T³ and T⁴, the former passing through the adjustable resistance I. The current transformer U' engages about the circuit wire B' and from it lead the wires S⁵ and S⁶ to the current coils. Each set of connections thus functions as already described upon the rotor, except for the fact that no exciting or field coils are employed and shading coils are substituted for the purpose of securing a rotative magnetic field.

What I claim is:

1. In combination with electrodes, circuit wires leading from a suitable source of power, means for effecting alterations in the electrical conditions prevailing within the circuit, a movable element adapted to be actuated into contact with one or the other of a plurality of contact terminals located in the circuit, an exciting winding, a current winding, and a potential winding, all three being operatively located with respect to said movable element, and said current winding and said potential winding being arranged to work in opposition to one another.

2. Electrode regulating means, comprising a power circuit, a stator member, an exciting winding, a current winding, and a potential winding arranged upon said stator member, each of said windings deriving its energization from said power circuit, a rotor member adapted to be oscillated by the energization of said stator members, means for effecting predetermined opposition of the current winding and the potential winding to one another, and means operatively connected with said rotor for effecting the movement of an electrode, according to the quantity of current furnished through said power circuit.

3. In combination with electrodes, a power circuit therefor, a stator member, an exciting winding, a current winding and a potential winding arranged thereon, said current winding and said potential winding being arranged to act in opposition to one another, auxiliary circuits connecting said several windings with said power circuit, a rotor member encircled by said stator member and adapted to be actuated according to the predominance of current conditions in said stator windings, and connecting means between said rotor member and one of said electrodes whereby it may be moved according to the input desired.

In testimony whereof, I sign this specification in the presence of two witnesses.

OLIVER J. MARSHICK.

Witnesses:
WILLIAM M. SWAN,
JEFFERSON G. THURBER.